Dec. 23, 1930.  F. E. STAHL  1,786,318

CROSS CHAIN FOR ANTISKID DEVICES

Filed April 30, 1930

Inventor
FRANK E. STAHL
Attorneys

Patented Dec. 23, 1930

1,786,318

UNITED STATES PATENT OFFICE

FRANK E. STAHL, OF TONAWANDA, NEW YORK, ASSIGNOR TO THE COLUMBUS-McKINNON CHAIN CORPORATION, OF TONAWANDA, NEW YORK, A CORPORATION OF OHIO

CROSS CHAIN FOR ANTISKID DEVICES

Application filed April 30, 1930. Serial No. 448,721.

This invention relates to chains for antiskid devices for use on wheels, and, more particularly to cross chains for such devices.

The object of the invention is to provide an improved, simplified and inexpensive form of link for such chains whereby the chain is rendered more effective in biting into the road or the ice on the road to prevent skidding. This effectiveness of link is obtained without producing serious wear on the tire. Other objects will appear from the disclosure herein.

The invention is embodied in the example herein shown and described, the features of novelty being finally claimed.

In the accompanying drawing—

In the views like characters of reference designate corresponding parts.

Figure 1:
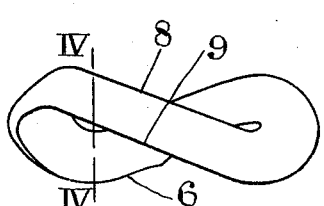
Figure 1 is an edge view of the link according to the invention.
Figure 2:
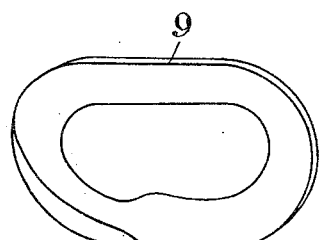
Fig. 2 is a plan view of the same looking upward at Fig. 1.
Figure 4:
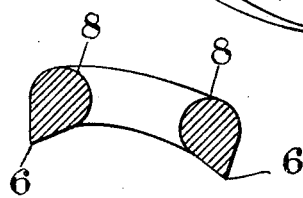
Fig. 4 is a cross section of the link on the line IV—IV Fig. 1.

The link is manufactured from wire formed in a die of the cross section shown in Fig. 4, that is to say of ovate form with the one side at 8 round the other tapered to a sharp edge 6 that in the original wire, extends longitudinally along the wire in a substantially straight line parallel to the axis thereof. In the process of manufacture the wire is cut into uniform lengths that are each welded at their ends as shown at 7 so that the sharp edge 6 of each link continues around one side or face of the link while the wire of the other is rounded. The pieces of wire are, of course, each threaded or linked into a previously formed link in making the chain. The straight link when formed is oppositely twisted at its bent ends so as to leave portions of the link between the ends straight as shown at 9 but by reason of the twisting of the ends lying in intersecting planes as best seen in Fig. 1.

It is desirable that the welds of alternate links lie at opposite sides of the chain as this promotes the flatness of the chain when placed against the tread of the tire.

In practice the cross chain is placed with the rounded backs 8 against the tread of the tire so as to avoid wearing or abrading the tire and with the sharp edges projecting outward to engage the ground or ice thereon.

Figure 5:
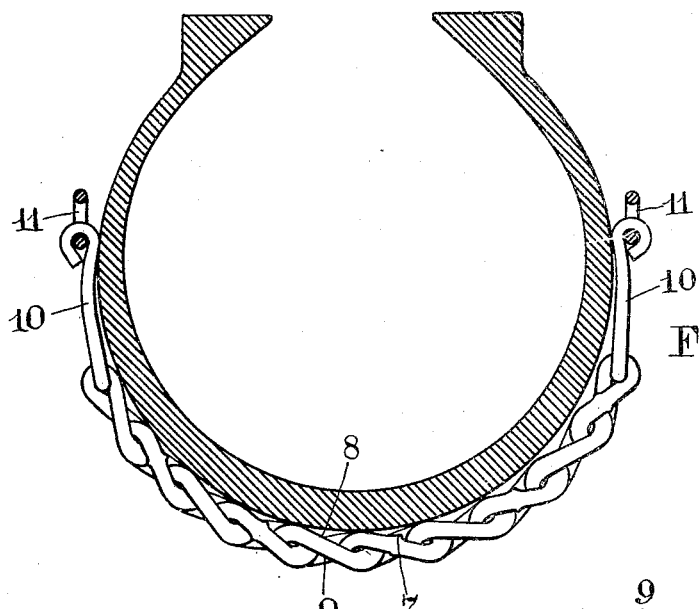
Fig. 5 illustrates a cross chain as the same appears applied to a tire casing, the latter being a cross section.

The cross chain has connected with each of its end links a hook 10 that is engaged with a link 11 of the usual side chain as best seen in Fig. 5 so that the hook cooperates in holding the cross chain with the biting edges projecting outward from the tire.

Figure 3:
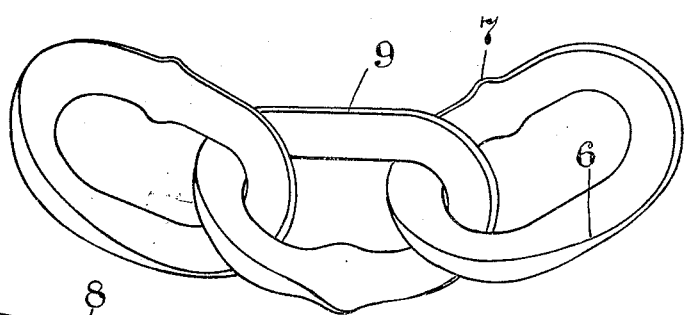
Fig. 3 illustrates three of the links.

In ordinary driving it will be observed that the sharp edges bite into the road or ice on some portion of the link while when the cross chain becomes flexed as seen in Fig. 3 and as for example when brakes are applied the twisted end portions present different biting edges. It will be observed also that the rounded backs of the links do not cause any appreciable cutting action of the tire thereby saving that member from rapid wear.

The forms of the parts can be changed without departing from the gist of the invention as claimed.

What I claim is:

1. A link for a tire chain having a twisted end and a sharp edge formed around one face thereof and its opposite face rounded.

2. A link for a tire chain having its opposite ends twisted and a sharp edge formed around one face thereof and its opposite face rounded.

3. A link of wire for a tire chain having its opposite ends twisted and a sharp edge formed longitudinally around one entire face thereof and its opposite face rounded, the wire of the link between said twisted ends being straight.

FRANK E. STAHL.